Nov. 8, 1949     H. A. RUDNICK     2,487,594

MEANS FOR AGING ALCOHOLIC LIQUORS IN BOTTLES

Filed Jan. 26, 1944

INVENTOR.
Harold A Rudnick
BY Ezekiel Wolf
his Attorney

Patented Nov. 8, 1949

2,487,594

UNITED STATES PATENT OFFICE 2,487,594

MEANS FOR AGING ALCOHOLIC LIQUORS IN BOTTLES

Harold A. Rudnick, Boston, Mass.

Application January 26, 1944, Serial No. 519,720

5 Claims. (Cl. 99—277.1)

The present invention relates to the aging of alcoholic liquors and in particular to such aging when or after the liquor has been released from bond while in the hands of the bottler, wholesaler, retailer or consumer.

It is well known that liquor is sold as aged according to the time it is in bond and that after it is taken out of bond, no matter how long it may be on the shelves or in the cellars, it is not considered as becoming further aged. In the case of whiskeys for instance the aging actually ceases when the whiskey is bottled and so also for the most part with other alcoholic liquors such as wine, brandies, rums, etc.

The object of the present invention is to provide means and methods for the continuation of aging when or after the liquors have been released from bond and bottled either in the hands of the wholesalers, retailers or consumer. Where the liquors are originally sealed when bottled, they may again be aged in the hands of the consumers.

The present invention applies to liquors which are bottled in glass bottles, transparent or opaque jugs, crocks or other containers other than wooden or wood lined barrels in which the liquors are commonly stored when in bond. The invention may take embodiment in many forms, but preferably is applied to glass or earthenware bottles or jugs in which liquor is usually vended and comprises aging material in various desirable forms in the bottles or jugs in such a manner that the aging process continuous indefinitely after the liquor has been bottled. The aging material should be of such a nature and construction that it cannot be removed from the bottle or jug after it has once been put in place and should have sufficient surface area to permit aging to continue at a reasonably rapid pace.

The advantages of the present invention are many. Aging is the difference between good liquors and poor liquors. An eight year old whisky is better than the same liquor at four years old and a twelve year old liquor is quite generally accepted as superior, possessing smoothness and taste not present in younger liquors. The higher price of the older liquors is due in part to the cost of storage, interest on the money invested, evaporation, tax and many other things. According to the present invention, the younger liquors may be aged by the consumer while the liquor is being used or the consumer may buy and stock the liquors and allow them to age in his cellar and so also may the wholesaler and retailer.

The invention will be described in the annexed specification in embodiments in various forms in connection with the drawings, in which.

Figure 1:
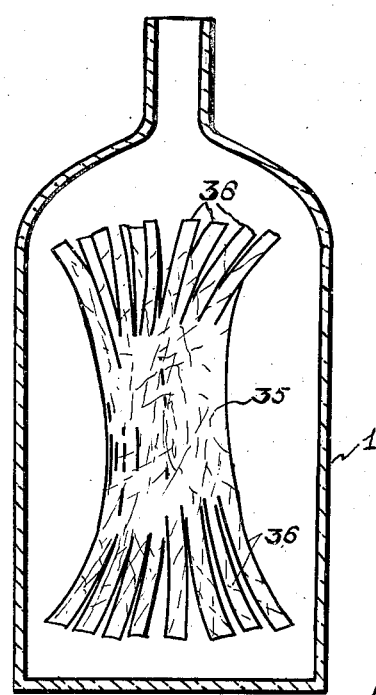
Figure 1 shows a vertical elevation of the invention in section.

In the arrangement shown in Figure 1 the bottle 1 may be the ordinary glass liquor bottle of any shape and size, or it may be a glass or stone crock or jug or a container, the walls of which are chemically inert to alcoholic liquors such as whisky, rum, brandy, gin, wines and other alcoholic beverages. The invention is preferably applicable to the glass bottles of any size in which alcoholic liquor is sold. There is placed in the bottle either when the liquor is put in or before or afterwards, sticks or rods 2 of any shape, but preferably elongated, of material to produce ageing of the liquor. This may be in the case of whisky, oak sticks, which may or may not be charred. The sticks as indicated may be of varying lengths and may rest against the sides and bottom of the bottle in any way.

The stick 35 in the bottle may be shredded as indicated by the shreds 36, 36, etc., at both ends of the stick in such a way that the shreds will open up when put in the bottle so that the stick cannot be removed. If desired the stick may comprise a bunch of rods held together at the central section and flaring out at the edges. For this purpose the wooden shreds may be given a set in the proper direction, then tied together and released after the stick has been placed in the bottle.

Figure 2:
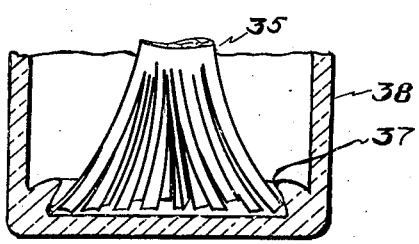
Figure 2 shows a detail of a modification in broken section.

In Figure 2 the end of the stick 35 may be supported upright in a recess 37 in the bottom of the bottle 38.

Figure 3:
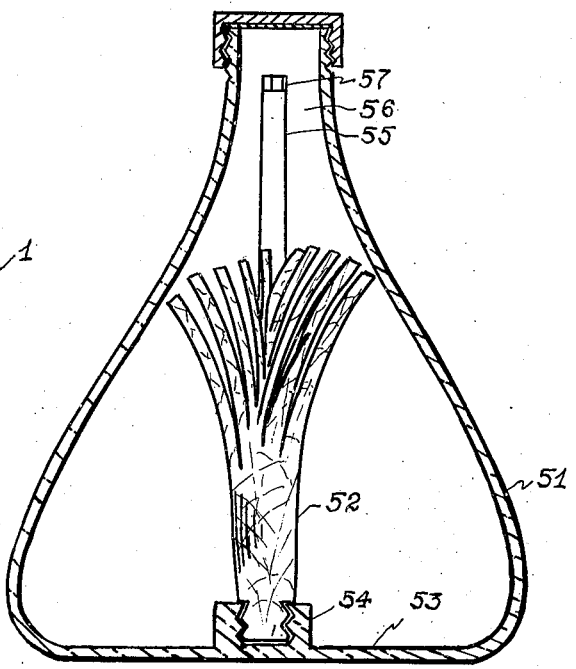
Figure 3 shows a further modification of the invention in sectional elevation.

In Figure 3 the bottle 51 may have an aging stick 52 screwed into the base 53 of the bottle 51 in a centrally located boss 54. The stick may be shredded at the top somewhat similar to that shown in Figure 1 but with a central whole section 55 projecting into the neck 56 of the bottle 51 which section is provided with a square or horizontal top 57 so that the stick may be screwed into the boss 54. The top of the bottle 51 may be capped in any suitable way.

In the various forms of the invention the aging material offers a large area to the liquor but it is kept intact so that it does not disintegrate and permit particles to mix in with the liquor. In fact if there is a tendency for a sediment, the sediment will tend to gather on the aging material and cling to it, thereby clearing the liquor. The aging sticks may be obtained by the consumer if he desires, who simply opens the bottles and sticks them in, or they can be put in the bottle when it is taken out of bond. When this occurs, the date of bottling should be noted on the bottle since by this method the length of the new aging process can be computed.

For the most part aging of alcoholic liquors has been done in oak or wooden containers. In this case the liquor gradually soaks into the walls of the barrel and a considerable amount of evaporation occurs. The rate of evaporation is initially high in a fresh, dry barrel and decreases after the barrel has been thoroughly wetted, after which evaporation takes place at a rather steady rate.

In the aging of alcoholic liquors in glass bottles this is avoided inasmuch as such bottles are not porous and the liquor does not soak through the bottle and evaporate, as in the ordinary aging methods. This has the advantage of providing a considerable saving in liquor and permits further continued aging without decrease in the liquor volume.

Having now described my invention, I claim:

1. Means for aging alcoholic liquors, comprising a bottle of glass or other material inert to alcoholic liquors, having aging material in the form of a stick of wood shredded in sections within the bottle and spread out over a surface larger than the neck of the bottle and arranged to be in direct surface contact with alcoholic liquor when introduced into the bottle.

2. Means for aging alcoholic liquors, comprising a bottle of glass or other material inert to alcoholic liquors, having aging material in the form of a stick of wood shredded in sections within the bottle, means for holding said stick in the bottle, one end of said stick being spread out over a surface larger than the neck of the bottle and arranged to be in direct surface contact with alcoholic liquor when introduced into the bottle.

3. Means for aging alcoholic liquors comprising a bottle of glass or other material inert to alcoholic liquors, a wooden stick of aging material, means whereby one end of said stick is made fast to the bottle, the other end of the stick being shredded and spread out over the surface of the bottle.

4. Means for aging alcoholic liquors comprising a bottle of glass or other material inert to alcoholic liquors, a wooden stick of aging material shredded at each end and enlarged to end sizes larger than the neck of the bottle contained therein, and arranged to be in direct surface contact with alcoholic liquor when introduced into the bottle.

5. Means for aging alcoholic liquors comprising a bottle of glass or other material inert to alcoholic liquor, a wooden stick of aging material threaded at one end, the bottom of said bottle having a boss threaded to receive the threaded stick, said stick being shredded and fanned out within a large volume of the bottle.

HAROLD A. RUDNICK.

REFERENCES CITED

The following references are of record in the file of this patent:

UNITED STATES PATENTS

| Number | Name | Date |
|---|---|---|
| 818,478 | Shwayder | Apr. 24, 1906 |
| 1,976,091 | Pritchett | Oct. 9, 1934 |
| 2,017,235 | Drew | Oct. 15, 1935 |
| 2,086,073 | Francescon | July 6, 1937 |
| 2,096,703 | Benedict | Oct. 19, 1937 |
| 2,108,661 | Farrier et al. | Feb. 15, 1938 |
| 2,114,009 | Ramsay | Apr. 12, 1938 |
| 2,203,229 | Nillson et al. | June 4, 1940 |

FOREIGN PATENTS

| Number | Country | Date |
|---|---|---|
| 9,869 | Great Britain | 1885 |